June 22, 1937.  E. F. DUBOIS  2,084,839

METHOD OF PRODUCING COFFEE EXTRACT

Filed Feb. 6, 1935

INVENTOR
Eugene F. Dubois
BY Francis E. Boyce
ATTORNEY

Patented June 22, 1937

2,084,839

UNITED STATES PATENT OFFICE 2,084,839

METHOD OF PRODUCING COFFEE EXTRACT

Eugene F. Dubois, Freehold, N. J.

Application February 6, 1935, Serial No. 5,176

1 Claim. (Cl. 99—71)

This invention relates to improvements in methods of producing coffee extract, the principal object of the invention being to provide a method by means of which an extract of coffee of excellent quality may be produced without the use of heat, whereby the natural flavor and aroma of the coffee is preserved in the extract, a very small quantity of which will be sufficient to make a delicious cup of coffee.

I have found that the object of the invention can be achieved by taking coffee pulverized to a fair degree of fineness, for instance about as fine as is ordinarily used for making what is known as "drip coffee", and wetting it with cold water while thoroughly kneading it so that every particle is saturated, and then packing the mass into a vessel and covering it with a body of cold water sufficient to provide a "head" such as to cause the extract to flow from the said vessel after a predetermined period of time. Experience has shown that best results are obtained by mixing and kneading together coffee and water in the approximate proportions of one pound of coffee to twelve ounces of water, and, after packing the mass in a vessel as hereinbefore stated, covering it with approximately twenty-four ounces of cold water, that is to say, water at room temperature, and permitting it to stand for approximately six hours. The vessel should be provided at its bottom with a tap for drawing off the coffee extract under the pressure of the water "head" above the coffee mass. Provision should also be made for the evacuation of any air trapped in the vessel below the coffee mass so that such air will not work its way up through the coffee and the water in the vessel.

In the drawing accompanying this specification,

Figure 1:
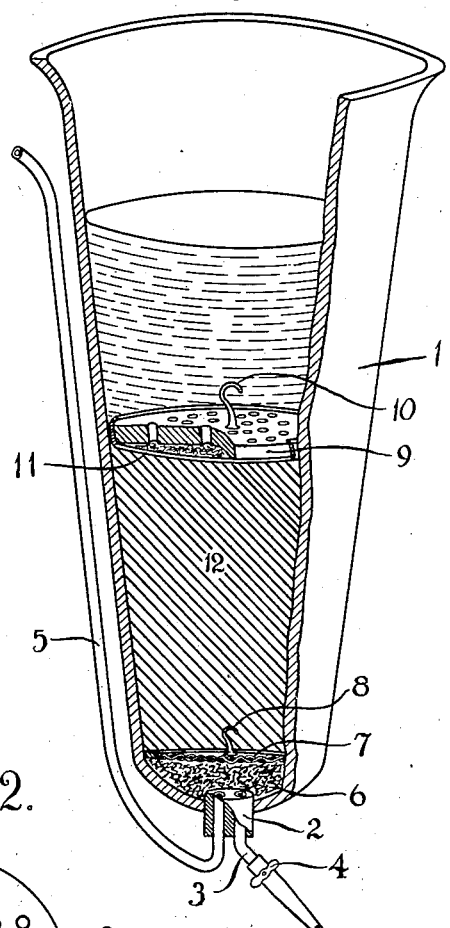
Fig. 1 is a perspective view of a vessel suitable for carrying out the method above described, a part of the wall of said vessel being broken away to show the interior thereof.
Figure 2:
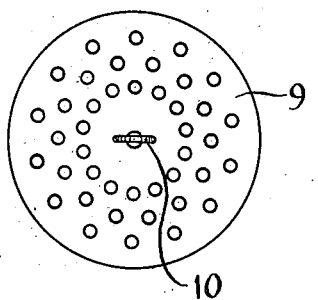
Fig. 2 is a plan view of a perforated disk which may be used as a part of the apparatus.
Figure 3:
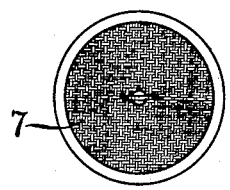
Fig. 3 is a plan view of a screen disk which may also form an element of the apparatus.

Referring to the drawing, 1 designates a vessel which is preferably of approximately cone shape and of any suitable material. As shown herein the vessel is provided at the center of its bottom with an opening in which is secured a plug 2, which may be of cork, rubber or metal and may be secured in the wall of the vessel by friction, or by thread connection, or in any other suitable manner. The plug 2 is provided with two perforations, in one of which is secured a short pipe 3 having a petcock 4, and in the other is secured the end of a long tube 5 which is bent upward outside of the plug and passes up parallel with the wall of the vessel to a point above the water level in the vessel so that no liquid in the vessel will flow from the upper end of said tube.

In the concave space formed at the bottom of the vessel immediately above the plug 2 is disposed a wad 6 of cotton or other suitable fibrous material, and a screen or strainer 7 of copper or other suitable metal and of proper diameter may, if desired, be disposed within the vessel immediately above said concave space. The screen preferably should be provided at its center with a hook 8 for convenience in removing the screen from the vessel.

The vessel is further provided with a perforated disk 9 the diameter of which should be such as to fit within the vessel at a point just above the packed mass of saturated coffee. This disk also should be provided with a hook 10 for convenience in removing the disk, and the under surface and periphery thereof should be covered with a sheet or sheets of soft filter paper as indicated at 11, Fig. 1. A suitable cover (not shown) may be provided for the vessel.

The apparatus above described is used in the following manner. With the petcock 4 shut off and the cotton wad 6 and screen 7 in place, a mass of coffee which has been thoroughly saturated and mixed with water in the approximate proportions hereinbefore stated, is packed in the vessel, the screen 7 forming a bottom for sustaining the weight of the coffee. While the coffee mass is being thus packed, any air that was trapped in the bottom of the vessel finds its way out through the tube 5, so that the coffee settles in a solid mass entirely free from air bubbles. The perforated disk 9, with its filter paper, is then placed in position above the coffee mass, and a quantity of cold water, preferably in the proportion of twenty-four ounces to the pound of coffee, is poured into the vessel. The principal function of the filter paper is to prevent the coffee from backing up through the perforations of the disk and around its edge. After the coffee has been allowed to set for about six hours, the petcock 4 is opened whereupon a coffee extract of superior quality will drain off through the tube 3. I have found in practice that the best results are obtained by taking off no more than sixteen ounces of extract from one pound of coffee.

In the treatment above described, all of the original fragrance and potency contained in the roasted coffee bean is retained in the resulting extract or essence, due to the absence of heat in the extracting method. Moreover, no preservative of any kind is added, notwithstanding which fact, tests over long periods of time have unquestionably proven that the extract when placed in airtight containers will retain its delicious flavor indefinitely.

Having thus described my invention, what I claim is:

The method of producing coffee extract which consists in kneading a mass of pulverized coffee and water, packing said mass into a receptacle and simultaneously forcing out the air from below the said mass, covering said mass with a body of water and permitting it to stand for a predetermined time, and then drawing off the liquid from said mass.

EUGENE F. DUBOIS.